United States Patent Office 3,307,950

Patented Mar. 7, 1967

3,307,950

STRIPPING FILMS

Arthur Appelbaum, Highland Park, N.J., assignor to E. I. du Pont de Nemours and Company, Wilmington, Del., a corporation of Delaware No Drawing. Filed Sept. 19, 1963, Ser. No. 310,153
8 Claims. (Cl. 96—83)

This invention relates to stripping films, and more particularly it relates to transparent photographic stripping films for the graphic arts industry.

Stripping films, of course, are well known, and are used for a variety of purposes in both, the photographic art and decalcomania art. In particular, stripping films are widely used in the graphic arts industry. Such films usually comprise a temporary support, a stripping layer, a permanent support and a radiation-sensitive layer, usually a gelatino-silver halide emulsion layer. Of course, other auxiliary layers may be and usually are present in the structure, e.g., water-proofing layers, subbing layers, antihalation and filter layers. In the case of photographic stripping films, the emulsion layer may be exposed and processed either before, during, or after stripping takes place.

Because of the variety of processes utilized in the industry, there is a need for stripping films having very exacting characteristics for more specific applications. To illustrate the problems involved, films used for rotogravure are a case in point. The procedure for making a rotogravure printing element is usually carried out in the following manner. A light-sensitive, gelatino, silver halide, stripping film, is exposed and developed in a hardening developer and fixed. After washing and drying, the processed film is then adhered, emulsion side down, to a moistened gravure copper plate or cylinder and the temporary supporting film base dry stripped from the permanent support which adheres and protects the emulsion layer. After dry stripping, the permanent support is removed by solvent and the copper plate or cylinder is then immersed in hot water to remove the unexposed and unhardened non-image areas of the gelatin emulsion layer thus forming a relief of varying thickness (in direct proportion to silver densities) of hardened gelatin on copper. After thorough drying of the gelatin relief image and covering over the non-image areas with asphaltum, as is common in the art, the image is etched into the copper with aqueous ferric chloride solutions.

In the processes just described, the stripping film element is subjected to several stages of wetting and drying. It is well known that gelatin is very susceptible to the influence of aqueous solutions. It expands when wetted and contacts when dried and this, of course, greatly influences the dimensional stability of the image. Generally, stripping films have been constructed of a base of cellulose acetate having waterproofing layers on both sides thereof, a stripping layer, at water-impermeable cellulose nitrate membrane, a gelatin anchoring layer and a gelatino silver halide emulsion layer. The cellulose nitrate layer is necessary to form a dimensionally stable support for the emulsion layer and to act as a water-impermeable protective layer for the relatively delicate gelatin image adhered to the printing surface.

More recently, a greatly improved stripping film has been constructed using, as a base support, a highly polymeric linear ester of a dicarboxylic acid and a dihydric alcohol e.g., polyethylene terephthalate. The polymeric base is dimensionally stable and highly resistant to the influence of aqueous processing solutions. As a water-impermeable stripping layer on the polyester support there is used a mixture of (1) 40 to 80 parts by weight of an n-butyl methacrylate/itaconic acid copolymer containing 96–99.5% by weight of an n-butyl methacrylate with (2) 60 to 20 parts by weight of a vinylidene chloride addition copolymer containing at least 35% vinylidene chloride, preferably a vinylidene chloride/unsaturated ester/itaconic acid copolymer, e.g., vinylidene chloride/methyl acrylate/itaconic acid copolymer containing said ingredients in the respective percentages, by weight, of 35–96%, 3.5 to 40% and 0.5 to 25%. Over this stripping layer there is coated a gelatin anchoring layer and a gelatino-silver halide emulsion layer. An additional soluble gelatin layer may be interposed between the emulsion layer and the gelatin anchoring layer to facilitate the removal of the anchoring layer and residual stripping layer. The above stripping element is described and claimed in assignee's patent, Alles U.S. 3,043,695.

While the above stripping element offers many advantages over the prior art structures it suffers from some deficiencies. It has been found, for example, that the stripping layer comprising the mixture of copolymers sometimes has a tendency to "craze" or break up into fine cracks on drying and this forms a layer which is water permeable. Such a layer also causes haze in the developed emulsion layer due to light scattering during exposure. It is quite obvious that haze due to light scatter is undesirable. Water permeability is also quite serious, particularly where an auxiliary water soluble gelatin layer is interposed between the anchoring layer and the emulsion layer. The difficulty here arises from the fact that a printing cylinder is usually made up, by laying several pieces of work on the cylinder in several sequences of operation. In other words, the technician will make a lay-down of a piece of work on a cylinder and strip off the temporary support. In performing this operation the surface of the cylinder is wetted so that the gelatin emulsion surface will adhere well to the metal surface. The stripping element however, does not absorb a sufficient amount of water to release the stripping membrane which acts as a protective layer to prevent damage to the image until it is ready for hot water etching. In laying down the next and succeeding sections, the areas of the cylinder to be contacted must be wetted, but it is important that further wetting of sections previously laid down be avoided in order to prevent the premature release of the protective layers and possible distortion of the images.

It has now been found that the above difficulties can be overcome and an improved stripping film can be made by a novel variation in the composition of the stripping layer to be hereinafter described. According to this invention, if the n-butylmethacrylate/itaconic acid copolymer of Alles et al. U.S.P. 3,043,695 is modified to include from 3% to 20% by weight of a higher alkyl acrylate or methacrylate monomer in which the alkyl group contains from 6 to 12 carbon atoms, a greatly improved stripping composition is obtained. The resulting copolymers contain 76–96.5% n-butylmethacrylate, 20–3% higher alkyl acrylate or methacrylate and 4–0.5% itaconic acid. As alkyl groups of the higher alkyl esters there may be mentioned n-hexyl, n-octyl, n-decyl and n-dodecyl acrylate and methacrylate. The corresponding iso- and branched chain, e.g., secondary and tertiary, esters can be used. Mixtures of two or more of the above esters, e.g., n-decyl methacrylate and n-octyl methacrylate can be used.

A particularly preferred copolymer of the invention is made by copolymerizing n-butyl methacrylate with n-hexyl methacrylate and itaconic acid in a ratio of monomers of 95/3/2 respectively. The aqueous dispersion of the resulting copolymer is made up to 30% solids for admixing with the above described vinylindene chloride copolymer as taught by assignee's patent, Alles U.S. 3,-043,695. When a stripping film is constructed as in Example I of the above Alles patent but using the above n-butyl methacrylate/higher alkyl arcylate/itaconic acid copolymer alone or in admixture with a vinylidene chloride/methyl acrylate/itaconic acid copolymer, a highly satisfactory stripping element is obtained in which the stripping layer, upon drying, is free from cracks and the processed image is free from haze. The stripping tension and permeability of the stripping composition is quite satisfactory. However, if higher stripping tension is desired the ratio of the vinylidene chloride copolymer may be increased. The stripping tension may also be varied by varying the coating weight. Higher coating weights generally produce lower stripping tensions.

The copolymers may be made by any convenient method well-known in the art. For example, a typical copolymer may be made as follows: A suitable 3-necked flask was equipped with a stirrer, a nitrogen inlet tube, thermometer, and a reflux condenser and placed in a hot water bath. In the flask were placed 685 ml. of distilled water, 50 grams of 30% aqueous solution of sodium dodecyl sulfate, 284.0 grams of inhibitor-free n-butyl methacrylate, 9 grams of n-hexyl methacrylate and 6.0 grams of itaconic acid. The air in the flask was displaced with nitrogen and a solution of 1.56 grams of ammonium persulfate and 0.60 gram of sodium metabisulfite each in 26.0 ml. of water was added. The mixture was stirred under nitrogen and the temperature was raised to 50° C. After a short induction period, the reaction started (as indicated by a temperature rise). The polymerization was conducted for 3.3 hours, the temperature being held between 50° C. and 70° C. The reaction mixture was cooled and placed in a suitable container for use. The resulting copolymer had a ratio of n-butyl methacrylate co n-hexylmethacrylate co itaconic acid of 95/3/2.

The vinylidene chloride/methyl acrylate/itaconic acid copolymer was made as described in Swindells U.S.P. 2,698,235 granted December 28, 1954. This copolymer can be admixed with water and the two-component copolymer previously described.

In making resists from a photographic film element of the invention, it can be exposed by one of the usual methods to produce the desired latent image in the photosensitive layer. For instance, in making a gravure plate, the film can be exposed through a halftone screen for a suitable time and then through a continuous tone positive or vice versa. Other conventional types of screens and sequences of exposure can be used, including the screens and procedures disclosed in Kott U.S. Patent 2,628,903 of February 17, 1953. The exposed film can then be developed in a hardening developer as described in Boyer et al. U.S. 2,650,878 of Sept. 1, 1953, and in White et al. U.S. Patent 2,638,417 of May 12, 1953, and further treated and used to form an etched plate as disclosed in said patents.

The invention will now be illustrated but is not intended to be limited by the following examples wherein the photographic film is made in the substantial absence of actinic light, and all parts and percentages are by weight, unless otherwise indicated.

EXAMPLE I

A polyethylene terephthalate film made by the procedures set forth in U.S. Patent 2,627,088 was coated with a 4% aqueous solution of the copolymer of Example II of U.S. Patent 2,698,235 noted above to form an anchoring layer. The film was then molecularly oriented by stretching in the manner described in U.S. Patent 2,-627,088 to form a film base of about 7 mils in thickness. A gelatin subbing solution having the formula:

| | Percent by weight |
|---|---|
| Gelatin | 1.08 |
| Thymol | 0.10 |
| Cetyl betaine | 0.92 |
| Chrome alum | 0.18 |
| Colloidal silica (mμ) | 0.28 |
| 3 N NaOH, to adjust pH to 6.0. | |
| Water to make | 100.00 |

was coated over the copolymeric anchor layer on one side of the film. An antihalation layer comprising gelatin chrome alum and Acid Magenta O (Rowe's Colour Index No. 692) is subsequently applied over this anchor layer, after the following treatments are applied to the opposite uncoated side of the film.

The aqueous dispersion of poly n-butyl methacrylate/n-hexyl methacrylate/itaconic acid (95/3/2) described in the preceding preparation exists as a 44% solids dispersion. An aqueous dispersion of a vinylidene chloride/methyl acrylate/itaconic acid copolymer was made according to Example I of U.S. Patent 2,698,235 in proportions of monomer by weight of 85/15/2 to provide a 50% solids dispersion. Portions of the above aqueous dispersions were mixed in a ratio of 80% of the n-butyl methacrylate/hexyl methacrylate/itaconic acid copolymer to 20% of the vinylidene chloride/methyl acrylate/itaconic acid copolymer. The solids content was adjusted to 30% by the addition of distilled water and the pH of the resulting mixture was adjusted to 7 with ammonium hydroxide. The dispersion mixture was then coated on the opposite surface of the polyethylene terephthalate film in an amount to give a dry coating weight of 35 mg./dm.². The coating was dried at 190° F. A gelatin anchor layer having the following composition was applied over the above copolymer layer.

| | Percent by weight |
|---|---|
| Gelatin | 1.08 |
| Thymol | 0.10 |
| N-cetyl betaine | 0.92 |
| Colloidal silica (particle size 17 mμ) | 0.28 |
| Chrome alum | 0.18 |
| Water to make | 100.00 |

The film was then heat-relaxed at 120° C. in the manner taught in U.S.P. 2,779,684. Over the gelatin anchor layer there was coated a gelatin solution of the following composition:

| | Percent by weight |
|---|---|
| Gelatin | 5.500 |
| Potassium chloride | .032 |
| Saponin | .045 |
| Glycerine | .158 |
| Ethyl alcohol | 1.820 |
| Thymol | .010 |
| Water to make | 100.00 |

This gelatin composition was applied to give a soluble gelatin layer having a coating weight of about 60–65 mg./dm.², based on weight of the gelatin.

Over the resulting soluble gelatin layer there was coated an orthochromatically sensitized gelatino-silver chlorobromide emulsion containing 25 mole percent of silver chloride. The coating weight of the resulting emulsion layer was about 60 to 65 mg. of silver halide per sq. dm. which gave a layer thickness of about .0006 inch, when dry.

The resulting dried film structure showed no evidence of cracking and in subsequent use, as described below, the copolymer membrane showed good impermeability to aqueous solutions.

The resulting dried film structure was exposed in a vacuum printing frame through a 150-line conventional gravure screen for 8 seconds to a 25-watt tungsten lamp placed 8 feet from such screen. The film was then exposed through an optical $\sqrt{2}$ stepwedge for 9 seconds to a 15-watt lamp at 8 feet. The exposed film was then processed in the following manner:

(1) Developed in a two-bath hardening developer solution as follows:

"A" Solution (3 minutes):

| | |
|---|---|
| Sodium metabisulfite, grams | 5 |
| Pyrogallol, grams | 5 |
| water to make 1 liter. | |

"B" Solution (2 minutes):

| | |
|---|---|
| Sodium carbonate (monohydrate), grams | 100 |
| Water to make 1 liter. | |

(2) Washed for 1 minute in water at 68° F.
(3) Fixed for 3 minutes in a solution at 65° F. having the following compositions:

| | |
|---|---|
| Sodium thiosulfate, grams | 200 |
| Boric acid, grams | 15 |

Water to make 1 liter.
(4) Washed for 10 minutes in water at 68° F.
(5) The film was then dried.

The processed emulsion layer showed no evidence of haze due to light scatter. The processed film was then adhered, emulsion side down, to a gravure copper plate, by standard procedure as practiced in the art for laying down gravure resist material. The base was then dry-stripped from the film. The layer of the mixture of copolymers (a) and (b) adhering to the gelatin was removed by dissolving the layer with methyl ethyl ketone. This required from 1 to 4 minutes for satisfactory removal. The copper plate containing the film was then immersed in a bath of hot water at 125° F. for ten minutes to dissolve away all unexposed, unhardened gelatin; thus forming a relief of varying thickness (in direct proportion to silver densities) of hardened gelatin on the copper. After thorough dying of the gelatin relief image and covering over the base areas of copper with asphaltum as is common practice in the art, the stepwedge relief images were etched into the copper, in normal gravure fashion with ferric chloride solutions to form a satisfactory printing plate.

EXAMPLE II

Example I was repeated except that the stripping composition consisted of 70% of the n-butyl methacrylate/n-hexyl methacrylate/itaconic acid copolymer and 30% of the vinylidene chloride/methyl acrylate/itaconic acid copolymer. All other conditions and operations of manufacture, exposure and processing were identical with Example I. There was no evidence of haze in the developed emulsion layer due to cracking of the stripping layer. There was also no evidence of decreased adhesion of the stripping layer because of water permeability of the stripping layer. Because of the lower proportion of the vinylidene chloride copolymer in the mixture, the stripping tension was somewhat lower than in Example I. The normal gravure procedures after stripping were carried out as described in Example I to give a satisfactorily etched, good quality printing plate.

EXAMPLE III

Example I was again repeated using, in place of the stripping composition of that example, a stripping layer composed of a mixture of 60% of the n-butyl methacrylate/n-hexyl methacrylate/itaconic acid and 40% of the vinylidene chloride copolymer. All other conditions and operations of manufacture and use were identical with Example I. There was no evidence of cracking of the stripping layer during drying in manufacture. In subsequent lay-down operations the stripping tension was satisfactory and somewhat less that in the element of Example I although slightly greater than in Example II.

EXAMPLE IV

Example I was repeated except that the stripping layer was coated from a 30% aqueous dispersion of n-butyl methacrylate/n-hexyl methacrylate/itaconic acid copolymer as the sole polymeric compound in the dispersion. All other manufacturing and use operations were carried out as in Example I. A clear stripping layer showing no cracks was obtained and the stripping tension during removal of the temporary support was only slightly less than in Example I thus providing a highly satisfactory stripping film from the standpoint of manipulation.

EXAMPLE V

Example I was repeated except that the vinylidene chloride/methacrylate/itaconic acid copolymer was changed from a ratio of 85/15/2 to a 90/10/2 ratio and the ratio of n-butyl methacrylate copolymer to vinylidene chloride copolymer was 60/40. All other conditions of manufacture and manipulation was carried out as in Example I. No cracking or crazing was evident in the stripping layer and water impermeability was excellent.

EXAMPLE VI

Example I was repeated except that in place of the n-butyl methacrylate/n-hexyl methacrylate/itaconic acid copolymer there was used an n-butyl methacrylate/n-dodecyl methacrylate/itaconic acid copolymer. This copolymer had been made according to the above procedure using 9 grams of dodecyl methacrylate in place of 9 grams of n-hexyl methacrylate in the polymerization process. In carrying out the manufacture and gravure process as described in Example I, a highly successful result was obtained. The stripping layer was completely free from cracks and had good impermeability to water. There was no evidence of haze in the developed emulsion layer resulting from light scatter and the stripping tension was satisfactory.

EXAMPLE VII

Example I was repeated using in place of n-butyl methacrylate/n-hexyl methacrylate/itaconic acid the copolymer: n-butyl methacrylate/n-decyl-n-octyl methacrylate/itaconic acid. This latter copolymer was made according to the above procedure using 270 grams of n-butyl methacrylate (commercially available), 15 grams of n-dodecyl-n-octyl methacrylate (manufactured by Rohm & Haas and comprising ca. 56% n-octyl methacrylate, 40% n-decyl methacrylate and 4% other methacrylates) and 5.8 grams of itaconic acid in place of the ingredients in the above polymerization procedure. In carrying out the manufacture and gravure processes of Example I, a satisfactory film was obtained which provided high quality gravure printing plates.

EXAMPLE VIII

Example I was repeated except that in place of the n-butyl methacrylate/n-hexyl methacrylate/itaconic acid copolymer there was used 80% of the copolymer: n-butyl methacrylate/n-octyl acrylate/itaconic acid made by polymerizing 254 grams of n-butyl methacrylate, 30 grams of n-octyl acrylate and 5.8 grams of itaconic acid according to the above procedure. As in the preceding examples, a highly satisfactory stripping film free from the aforementioned defects was obtained.

The copolymers in the stripping layer may vary in the ratios of monomeric components. For example, in the case of the n-butyl methacrylate/n-hexyl methacrylate/itaconic acid copolymer the percent by weight of n-butyl methacrylate may range from 8.0 to 98, the higher alkyl acrylic esters and itaconic acid, of course, making up the percentage difference. The preferred range of n-butyl methacrylate, however, is 90 to 95. In the case of the vinylidene chloride/methyl acrylate/itaconic acid copolymer the practical and preferred ranges are as follows:

| | Range, Percent | Preferred Range, Percent |
|---|---|---|
| Vinylidene chloride | 35.0 to 96 | 60 to 94. |
| Methyl acrylate | 3.5 to 40 | 5 to 35. |
| Itaconic acid | 0.5 to 25 | 1 to 5. |

Benzene, toluene, xylene, dioxane, acetone, turpentine and mixtures of two or more of said solvents, and other organic solvents may be used to remove the copolymeric stripping film after lay-down.

While the silver halide emulsion and the gelatin sublayer are usually colorless, dyes may be incorporated in either or both of these layers for various reasons. For example, the clear gelatin layer, if one is used, may contain an antihalation dye and thus make it unnecessary to have an antihalation layer on the back of the base.

If desired, various photographic sensitizing dyes, e.g., cyanine, pseudocyanine, carbocyanine, merocyanine and styryl dyes, can be added to the silver halide emulsions to extend their sensitivity to the green and red regions of the visible spectrum.

An advantage of the novel dry-stripping films of the invention is that they are dependable and give satisfactory results. They are free from cracks in the stripping layer which forms a smooth continuous water impermeable layer on drying. They are simpler and more economical to manufacture than those generally used in the photogravure art, taking cognizance, of course, of the superiority of film elements using silver halide emulsions over the gelatin-bichromate elements on paper supports used in the very early processes.

Another and outstanding advantage of the invention is the ease of control of the stripping tension during manufacture. This is of paramount importance for an acceptable product in the graphic arts trade.

A still further advantage of the invention is the freedom from haze in the processed image caused by light scatter during exposure.

While the novel stripping layers may be used as disclosed above in conjunction with various bases, e.g. cellulose esters, polycarbonates etc. coated with vinylidene chloride/acrylic ester/itaconic acid copolymers after the manner described in U.S. Patent 2,698,235; they are particularly efficacious when used on the oriented polyester films predominating in polyethylene terephthalate as described above. This offers an important advantage of dimensional stability.

I claim:

1. A photographic stripping film comprising a flexible film base bearing on at least one surface a stripping layer comprising an n-butyl methacrylate/higher alkyl ester/itaconic acid copolymer, wherein said higher alkyl ester is a member selected from the group consisting of the alkyl acrylates and methacrylates wherein the alkyl group contains 6–12 carbon atoms, the components being present within the ranges 76–96.5%, 20.3% and 4.0–0.5%, respectively.

2. A photographic stripping film comprising a flexible hydrophobic polymer film base bearing on at least one surface, in order, a stripping layer comprising an n-butyl methacrylate/higher n-alkyl ester/itaconic acid copolymer, wherein said higher alkyl ester is a member selected from the group consisting of the n-alkyl acrylates and n-alkyl methacrylates where the n-alkyl group contains 6–12 carbon atoms, the three components being present within the ranges 76–96.5%, 20–3% and 4.0–0.5%, respectively, a gelatin sublayer and a water-permeable colloid-silver halide emulsion layer.

3. A photographic stripping film comprising a flexible film base bearing on one surface, in order, a stripping layer comprising (1) 40–80 parts by weight of an n-butyl methacrylate/n-alkyl methacrylate/itaconic acid copolymer wherein the n-alkyl radical contains 6–12 carbon atoms and the three components are present within the ranges 76–96.5%, 20–3% and 4.0–0.5%, respectively, and (2) 60 to 20 parts by weight of a vinylidene chloride addition copolymer containing at least 35% vinylidine chloride by weight, a gelatin sublayer and a water-permeable colloid-silver halide emulsion layer.

4. A photographic stripping film comprising a flexible film base bearing on one surface, in order, a stripping layer comprising (1) 40–80 parts by weight of an n-butyl methacrylate/n-alkyl acrylate/itaconic acid copolymer wherein the n-alkyl radical contains 6–12 carbon atoms and the three components are present within the ranges 76–96.5%, 20–3% and 4.0–0.5%, respectively, and (2) 60 to 20 parts by weight of a vinylidene chloride addition copolymer containing at least 35% vinylidene chloride by weight, a gelatin sublayer and a water-permeable colloid-silver halide emulsion layer.

5. A photographic stripping film comprising a flexible film base bearing on one surface, in order, a stripping layer comprising (1) 40–80 parts by weight of an n-butyl methacrylate/n-alkyl methacrylate/itaconic acid copolymer wherein the n-alkyl radical contains 6–12 carbon atoms and the three components are present within the ranges 76–96.5%, 20–3% and 4.0–0.5%, respectively, and (2) 60 to 20 parts by weight of vinylidene chloride/unsaturated ester/itaconic acid copolymer wherein said ester is a member selected from the group consisting of n-methyl, n-ethyl, n-propyl and n-butyl acrylate and methacrylate, acrylonitrile, methacrylonitrile and vinyl chloride, the monomeric units of said copolymer being present in the respective amounts by weight of 35%–96%, 3.5%–40% and 0.5%–25% a gelatin sublayer and a water-permeable colloid-silver halide emulsion layer.

6. A stripping film according to claim 5 wherein said polymer film is biaxially oriented polyethylene terephthalate.

7. A photographic stripping film comprising a flexible film base bearing on one surface, in order, a stripping layer comprising (1) 40–80 parts by weight of an n-butyl methacrylate/n-alkyl acrylate/itaconic acid copolymer wherein the n-alkyl radical contains 6–12 carbon atoms and the three components are present within the ranges 76–96.5%, 20–3% and 4.0–0.5%, respectively, and (2) 60 to 20 parts by weight of a vinylidene chloride/unsaturated ester/itaconic acid copolymer wherein said ester is a member selected from the group consisting of n-methyl, n-ethyl, n-propyl and n-butyl acrylate and methacrylate, acrylonitrile, methacrylonitrile and vinyl chloride, the monomeric units of said copolymer being present in the respective amounts by weight of 35%–96%, 3.5%–40% and 0.5%–25% a gelatin sublayer and a water-permeable colloid-silver halide emulsion layer.

8. A strip film according to claim 7 wherein said polymer film is biaxially oriented polyethylene terephthalate.

No references cited.

J. TRAVIS BROWN, *Acting Primary Examiner.*

R. H. SMITH, *Assistant Examiner.*